Oct. 24, 1950     W. F. ROLLMAN     2,527,197
METHOD OF PRODUCING A CARBON MONOXIDE AND HYDROGEN
GAS MIXTURE FROM CARBONACEOUS MATERIALS
Filed Feb. 17, 1945
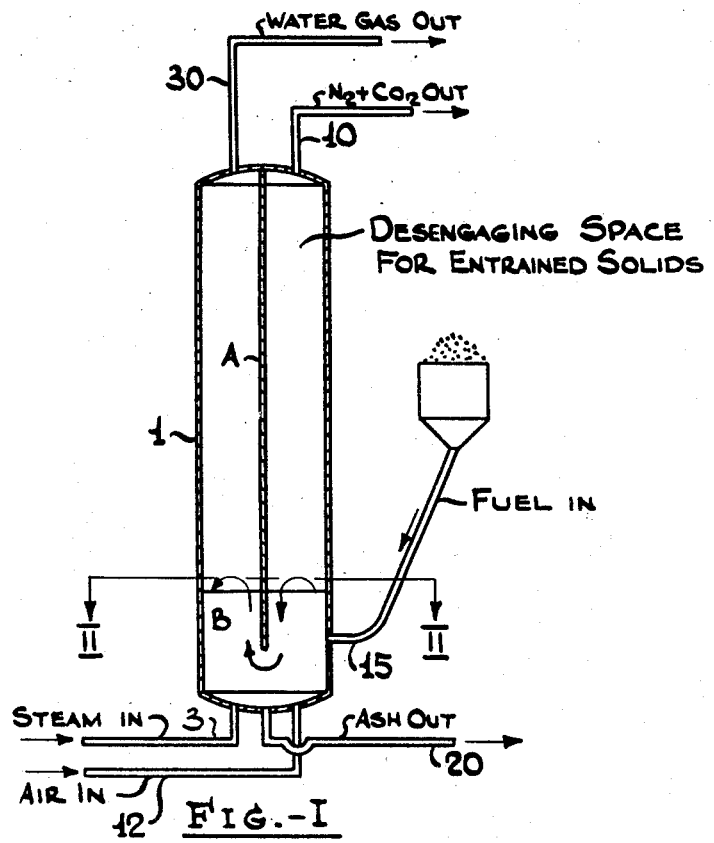
FIG.-I
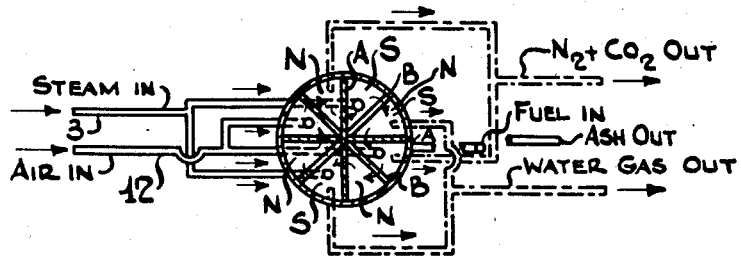
FIG.-II
Walter F. Rollman Inventor
By [signature] Attorney Patented Oct. 24, 1950

2,527,197

UNITED STATES PATENT OFFICE 2,527,197

METHOD OF PRODUCING A CARBON MONOXIDE AND HYDROGEN GAS MIXTURE FROM CARBONACEOUS MATERIALS

Walter F. Rollman, Cranford, N. J., assignor to Standard Oil Development Company, a corporation of Delaware Appplication February 17, 1945, Serial No. 578,436

4 Claims. (Cl. 48—206)

The present invention is fully disclosed in the ensuing specification and claims considered in connection with the accompanying drawing.

One object of the present invention is to provide a means for carrying out chemical reactions of two types such as an oxidation (burning) and another reaction which may be endothermic, side by side, contiguously, but out of actual contact, in the same generally confined space, so that heat may flow to and fro between the reaction zones.

A more specific object of my invention is to provide a process for producing a mixture of CO and hydrogen in an enlarged confined space and at the same time to cause burning of a fuel in zones which are contiguous to the CO and hydrogen forming zones, both reactions taking place within the said confined space, and transfer of solid materials between the several reaction zones within the said confined space being affected without recourse to conduits and/or valve means.

A still further object of my invention is to provide a process for producing a mixture of CO and hydrogen and to burn a fuel to supply heat to support the phase in named reaction, in the same enlarged confined space, but in different contiguous zones and providing means for permitting transfer of solid material from any zone to another without employing conduits and/or valve means.

The production of hydrocarbons, both gaseous and normally liquid, by catalytic synthesis using carbon monoxide and hydrogen is old. A great deal of research has been carried out in connection with this process for it affords a means of forming valuable hydrocarbons which may be converted, for example, to gasoline, heating oil, and the other products ordinarily obtained from petroleum. One of the main problems of the hydrocarbon synthesis from CO and hydrogen has been the development of and economical source of these gases. The most commonly used method of preparing carbon monoxide and hydrogen involves the reaction between steam and carbonaceous materials such as coal, coke, oil, coke oven gas, or natural gas.

In many chemical reactions, a solid catalyst is employed to promote the reaction. Thus, in cracking hydrocarbon oils, in oxidizing naphthalene, in synthesizing hydrocarbons from CO and H₂, a solid catalyst is used in modern practice. Heretofore, the catalyst was employed in the form of a stationary bed. But more recently, the so-called "fluidized" catalyst type of operation has come into general use. In this process, the catalyst in the form of a powder is suspended in the reaction vapors in a reaction zone and the process is chiefly characterized by the features of accurately controllable temperatures, maintenance of catalyst activity at nearly constant levels, continuity of operation and others.

My present invention relates to improvements in the "fluidized" catalyst type of operation and I shall hereinafter describe its application to the production of a mixture of CO and H₂, suitable as starting materials for synthesizing hydrocarbons and also its application to naphthalene oxidation, with the understanding that these two types of operations are merely illustrative of the broad principle involved and that other reactions may be successfully performed according to the teachings of this invention.

It is the main object of the invention to provide means for carrying out a fluid solids type of process in an operation involving both a productive phase and a solids reheating phase, in a single confined space and at the same time eliminating the necessity of utilizing transfer lines, valves, and, as indicated, a plurality of vessels.

Other and further objects of my invention will appear from the following detailed description and claims.

In the accompanying drawing, I have shown diagrammatically merely the essentials of an apparatus in which a preferred embodiment of my invention may be carried into practical effect in Figure I, and in Figure II, I have shown a cross section of the apparatus shown in Figure I taken along the lines II to II.

Referring in detail to Figures I and II, the generator consists of a vertical cylinder divided by two intersecting walls A extending from the top to a point at near the bottom of the vessel, thus dividing it into four zones or compartments. The generator is further divided in the lower portion thereof by two vertical walls B extending part way up from the bottom of the generator, into eight compartments or zones S. The eight chambers or zones comprise two burning chambers where carbonaceous material is burned in the presence of air to supply heat, two steaming zones in which the hot burned coke is treated with steam to form water gas and four interposed zones in which coke from a burning zone or a steaming zone passes therethrough downwardly to the bottom of a steaming or burning zone. In other words, the passage of the coke or other carbonaceous material is upwardly through the steaming and burning zones and downwardly through the interposed zones which form the communicating length between the said burning and steaming zones. Thus, steam is introduced at the bottom of two oppositely disposed chambers via feed line 3 where it contacts coke to form water gas which passes upwardly and finally exits through line 30; preheated air is introduced at the bottom of the two segments displaced 90° from those into which steam is introduced, causing burning of coke therein, and flue gas, consisting chiefly of $CO_2$ and nitrogen, is taken overhead through line 10. The coke or coal (which I term "fuel") which reacts with the steam to form the water gas previously mentioned is introduced through line 15 (see Figure I). In the example which I have chosen to illustrate my invention the coal or other carbonaceous fuel has an initial particle size of about 4 mesh.

The steam and air introduced at the bottom of the generator, as indicated, cause the fuel bed of the generator to be fluidized, and simultaneously gradually lift the fuel to the top of walls B where it spills over into the adjoining zone, passes downwardly therethrough (without reacting) and is withdrawn from the bottom thereof. It is then picked up by the rising air or steam (as the case may be) and carried into the next zone. The fuel is thus heated by combustion as it rises through an "air" chamber (or burning zone) and is cooled to a corresponding extent by the endothermic water gas reaction as it rises through a "steam" chamber or steam zone. This motion up and down the several chambers and around the lower portion of the generator continues until the fuel is consumed. Make-up fuel is, of course, added continuously. Ash produced in the process is removed via line 20 from the chamber immediately preceding that into which fuel is introduced, and the process is adjusted so that gasification of the fuel is completed in the "steam" chamber immediately preceding that from which ash is removed.

Referring in particular to Figure II it will be noted that there are four zones N which I have termed neutral zones, meaning that these are the zones in which the fluidized fuel spills over into a zone in which it forms a dense phase suspension and passes by gravity to the bottom thereof where it is picked up by either steam or air and passed into the next zone where it either is burned with air or converted to CO and $H_2$. Therefore, the term neutral means that the zone is one in which substantially no reaction takes place.

With respect to the term "fluidizing" I mean to imply a condition in which the granular or powdered fuel is suspended in the gas either by steam or air to form a suspension moving generally upward but at the same time permitting a sort of delayed settling of the solid fuel. In the present disclosure when I speak of the gas velocity of being 10 ft. per second, I refer to the velocity of the gas as if there were no solid present. Gas velocities of 10 ft. per second where a particle size of the coke is about 4 mesh results in a suspension in these zones in which the coke moves generally upward. It moves at a slower rate than the gas and consequently there is a slippage or delayed settling which I have previously referred to. There is also, however, sufficient turbulence of the individual particles of solid fuel to permit intimate and thorough mixing throughout the zone.

The process is independent of the rate of circulation of fuel in the generator, provided merely that the rate is sufficient to insure the necessary temperature level in the water gas generation sections. Unlike other proposed applications of the fluid solid technique to the generation of water gas, slide valves and transfer lines are not needed and only one vessel is required. The advantages, especially bearing in mind the high temperatures involved, are obvious.

The process which I have described is completely continuous, requires no pure oxygen, and the CO and $H_2$ contains only minor amounts of nitrogen and $CO_2$. The equipment is relatively simple.

The water gas which is withdrawn through line 30 may of course contain some powdered material, such as ash or unconsumed coal, or the like. This gas may be passed through the usual cyclone separators and/or electrical precipitators to cause the fines to be separated from the gas in equipment not shown, and then the water gas may be delivered to storage. I have omitted a great many conventional engineering expedients and devices for simplicity and to direct attention to my invention and have shown merely the essential elements of my own improvements. The skilled engineer, particularly one who is familiar with the fluid catalyst technique is well acquainted with the number of engineering devices, such as heat exchangers, preheating furnaces, pumps, valves, and the like which would be necessary as accessory apparatus in commercial units when used in conjunction with the features which I have shown and described in this specification and drawing.

In order to further illustrate my invention, I set forth below a typical example giving conditions and nature of the fuel and the yields so that an evaluation of my improvements may be possible.

Lignite, coke, or coal reduced to about 4 mesh is charged continuously to a generator of the type described at a rate which approximates 40 lbs./1000 cubic ft. of water gas produced. Material circulating in the system has a high ash content, and average particle size is less than as charged. The depth of the fluidized bed may be on the order of five feet and gas velocity up through the bed about 10 feet per second. Air and steam rates are adjusted so that temperature in the generation zone is around 1900° F., at which condition about 8200 cubic ft. per hour of water gas is produced per square foot of generation cross-sectional area. Following is a typical analysis of water gas: 51% hydrogen, 40% CO. 3% $CO_2$, 5% $N_2$.

The particle size of the fuel may vary from a powder of say 100 mesh to a size of ¼ to ½ inch lumps. Of course the larger the particle size the greater must be the velocity of the gases to give the fluidized condition. Therefore, the gas velocity in the steaming zone or the air zone may vary from ½ to 10 or more feet per second.

It will be understood, of course, that the specific design which I have shown in the drawing is merely illustrative and does not impose any limitation upon my invention. Thus, where I have shown in the drawing two steaming zones and two burning zones, I may use a greater or lesser number of zones. Thus, I may have one burning zone and one steaming zone or I may have three or more of these zones. Of course, in any case I will need the correct number of "down flow" zones to permit transfer of solids from one zone to the next reaction zone.

It should also be pointed out that while I have described in detail a method of preparing CO and hydrogen that my process is not limited to his precise reaction but may be used in any number of reactants where a solid contacts gasiform material. Thus, for example, the vapor phase oxidation of naphthalene to form phthalic and hydride, performed in the presence of powdered vanadium oxide (the catalyst), may be carried out in this apparatus in which case the naphthalene would be oxidized in certain zones in the presence of air or oxygen and the catalyst cooled in other zones. In this reaction, which is highly exothermic, the catalyst could be cooled in zones corresponding to the steaming zones in the case of CO and hydrogen production.

Numerous modifications of my invention will be apparent to those who are familiar with this art.

What is claimed is:

1. A continuous process for producing a mixture of CO and $H_2$ of sufficient purity to be utilized in a hydrocarbon synthesis process which comprises charging a sub-divided carbonaceous material to a burning zone of a gas generating system containing a plurality of contiguous zones disposed in the form of cylindrical sectors about a common axis within the same general confined space, said zones being in continuous open communication, some of said zones being burning zones, some water gas generating zones and the remainder neutral zones, passing air upwardly in said burning zone at a velocity sufficient to fluidize said carbonaceous material, partially burning the carbonaceous material in said first-named burning zone, withdrawing partially burnt carbonaceous material from a point above the bottom of said first-named burning zone and passing the same to the top of a contiguous neutral zone, whereby said partially burnt carbonaceous material flows downwardly to the bottom of said neutral zone in the form of a dense suspension, passing said partially burnt carbonaceous material from the bottom of said neutral zone into a contiguous water gas generation zone, introducing steam into said last-named zone under conditions to fluidize said partially burnt carbonaceous material, maintaining water gas generation temperatures in said last-named zone, forming a mixture of CO and $H_2$ in said zone, withdrawing water gas from said zone substantially uncontaminated by flue gas from said burning zone, withdrawing unconsumed carbonaceous material from a point above the bottom of said water gas generation zone, passing the same into a second neutral zone contiguous to said water gas generation zone, flowing said material downwardly in said second neutral zone and passing it therefrom to a second burning zone.

2. The process of claim 1 wherein said carbonaceous solids flow is continued, serially through the several zones in the order indicated until said carbonaceous material is substantially consumed.

3. The process of claim 1 wherein the path of flow of said carbonaceous material comprises two burning zones, two water gas generation zones and at least three neutral zones.

4. The process of claim 1 wherein ash produced in the process is removed from the system from a zone immediately preceding that into which said sub-divided carbonaceous material was introduced.

WALTER F. ROLLMAN.

REFERENCES CITED

The following references are of record in the file of this patent:

UNITED STATES PATENTS

| Number | Name | Date |
|---|---|---|
| 1,687,118 | Winkler | Oct. 9, 1928 |
| 2,341,193 | Scheineman | Feb. 8, 1944 |
| 2,428,872 | Gunness | Oct. 14, 1947 |

FOREIGN PATENTS

| Number | Country | Date |
|---|---|---|
| 115,689 | Australia | Aug. 6, 1942 |
| 632,466 | France | Oct. 10, 1927 |
| 564,870 | Germany | Nov. 24, 1932 |